(12) United States Patent
Miura et al.

(10) Patent No.: US 11,223,243 B2
(45) Date of Patent: Jan. 11, 2022

(54) CONTACTLESS POWER SUPPLY SYSTEM, CONTACTLESS POWER SUPPLY METHOD, AND CONTACTLESS POWER SUPPLY PROGRAM

(71) Applicant: OMRON Corporation, Kyoto (JP)

(72) Inventors: Takashi Miura, Ogaki (JP); Toshiyasu Miwata, Nagoya (JP); Yusuke Kawai, Ichinomiya (JP); Masashi Sato, Nagoya (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/265,812

(22) PCT Filed: Feb. 18, 2019

(86) PCT No.: PCT/JP2019/005834
§ 371 (c)(1),
(2) Date: Feb. 4, 2021

(87) PCT Pub. No.: WO2020/044603
PCT Pub. Date: Mar. 5, 2020

(65) Prior Publication Data
US 2021/0167639 A1  Jun. 3, 2021

(30) Foreign Application Priority Data

Aug. 29, 2018 (JP) .............................. JP2018-160271

(51) Int. Cl.
*H02J 50/80* (2016.01)
*H02J 50/12* (2016.01)
(Continued)

(52) U.S. Cl.
CPC ................ *H02J 50/80* (2016.02); *H02J 7/00* (2013.01); *H02J 50/005* (2020.01); *H02J 50/12* (2016.02)

(58) Field of Classification Search
CPC .......... H02J 50/80; H02J 50/12; H02J 50/005; H02J 7/00; H02J 7/00034; H02J 50/10; H02J 7/02; H02J 7/00045
See application file for complete search history.

(56) References Cited

U.S. PATENT DOCUMENTS

2005/0068161 A1  3/2005  Ichinose et al.
2009/0258616 A1* 10/2009  Miura ............... H04W 52/0219
455/127.1
(Continued)

FOREIGN PATENT DOCUMENTS

JP  2003-151064 A  5/2003
JP  2007-114906 A  5/2007
(Continued)

OTHER PUBLICATIONS

The International Search Report of PCT/JP2019/005834 dated Mar. 19, 2019.
(Continued)

*Primary Examiner* — Jared Fureman
*Assistant Examiner* — Michael J Warmflash
(74) *Attorney, Agent, or Firm* — Shinjyu Global IP

(57) ABSTRACT

A contactless power supply system includes a contactless power supply device and a power receiving device. Power is supplied from the contactless power supply device to the power receiving device while communication is performed therebetween. The power receiving device includes a power receiving coil unit, and a first communication unit that attaches information having continuity to data transmitted to the contactless power supply device. The contactless power
(Continued)

supply device includes a power supply coil unit, a second communication unit, and a power supply control unit that, in a steady state where communication is performed between two communication units after the second communication unit begins receiving the data transmitted from the first communication unit, refers to information having continuity attached to the data, and if continuity has been lost, performs correction to increase the output value of the power from the power supply coil unit to the power receiving coil unit.

20 Claims, 7 Drawing Sheets

(51) Int. Cl.
*H02J 50/00* (2016.01)
*H02J 7/00* (2006.01)

(56) References Cited

U.S. PATENT DOCUMENTS

| | | | |
|---|---|---|---|
| 2012/0040613 A1* | 2/2012 | Nakano | H02J 5/005 455/41.1 |
| 2013/0285618 A1* | 10/2013 | Iijima | H02J 50/10 320/137 |
| 2017/0256993 A1 | 9/2017 | Nakamura et al. | |
| 2017/0288462 A1 | 10/2017 | Suzuki | |
| 2018/0109293 A1 | 4/2018 | Nakase | |
| 2018/0262049 A1 | 9/2018 | Ikefuji et al. | |
| 2018/0316391 A1 | 11/2018 | Hijikata | |
| 2018/0342898 A1 | 11/2018 | Ikefuji | |
| 2020/0204214 A1 | 6/2020 | Nakase | |
| 2021/0167634 A1* | 6/2021 | Miura | H02J 7/02 |

FOREIGN PATENT DOCUMENTS

| | | |
|---|---|---|
| JP | 2010-288443 A | 12/2010 |
| JP | 2013-230008 A | 11/2013 |
| JP | 2014-195334 A | 10/2014 |
| JP | 2015-136219 A | 7/2015 |
| JP | 2016-146689 A | 8/2016 |
| JP | 2017-058863 A | 3/2017 |
| JP | 2017-077093 A | 4/2017 |
| JP | 2017-184411 A | 10/2017 |
| JP | 2018-068008 A | 4/2018 |
| JP | 2018-196290 A | 12/2018 |
| WO | 2017/033614 A | 3/2017 |
| WO | 2020/044602 A | 3/2020 |
| WO | 2020/044605 A | 3/2020 |
| WO | 2020/044606 A | 3/2020 |

OTHER PUBLICATIONS

The Written Opinion of PCT/JP2019/005834 dated Mar. 19, 2019.
The International Search Report of a related International application PCT/JP2019/005749 dated Mar. 19, 2019.
The Written Opinion of a related International application PCT/JP2019/005749 dated Mar. 19, 2019.
He International Search Report of a related International application PCT/JP2019/005887 dated May 21, 2019.
The Written Opinion of a related International application PCT/JP2019/005887 dated May 21, 2019.
He International Search Report of a related International application PCT/JP2019/005870 dated May 21, 2019.
The Written Opinion of a related International application PCT/JP2019/005870 dated May 21, 2019.

* cited by examiner

| NUMBER OF MISSING PIECES OF DATA | CORRECTION FACTOR (%) |
|---|---|
| ≤ 3 | 100 |
| 4 | 110 |
| 5 | 120 |
| 6 | 130 |
| 7 | 140 |
| 8 | 150 |
| 9 | 160 |

FIG. 7

CONTACTLESS POWER SUPPLY SYSTEM, CONTACTLESS POWER SUPPLY METHOD, AND CONTACTLESS POWER SUPPLY PROGRAM

CROSS-REFERENCE TO RELATED APPLICATION

This application is the U.S. National Phase of International Application No. PCT/JP2019/005834, filed on Feb. 18, 2019. This application claims priority to Japanese Patent Application No. 2018-160271, filed on Aug. 29, 2018. The contents of those applications are incorporated by reference herein in their entireties.

FIELD

The present invention relates to a contactless power supply system comprising a contactless power supply device and a power receiving device, and to a contactless power supply method and a contactless power supply program.

BACKGROUND

Recent years have seen the use of contactless power supply systems that wirelessly supply power from a power supply device to a power receiving device.

With some contactless power supply systems such as this, communication is performed between the power receiving device and the power supply device, and power is supplied from the power supply device on the basis of data received from the power receiving device via communication in the power supply device, for example.

With this configuration, the power receiving device is usually operated by a battery installed in the power receiving device. Therefore, there is a risk that there will not be enough power to operate the power receiving device if, for example, the battery charge on the power receiving device side drops to almost zero, or the power receiving device and the power receiving device are not in the proper positional relationship (the power supply and power receiving coils are too far apart, or the positional deviation is large), or the power supply efficiency of contactless power supply decreases to the point that the power required to operate the power receiving device cannot be supplied, or the system is affected by external disturbance (crosstalk, noise, etc.). Consequently, a problem was that a halt in function on the power receiving device side resulted in unstable wireless communication and unstable power supply.

For example, Japanese Patent Application Publication No. 2018-068008 A discloses a power supply device that halts the supply of power to the power supply unit for a specific length of time and then resumes the supply of power to the power supply unit, on the basis of a signal received by the communication unit from a plurality of power receiving devices, in order to supply power to the power receiving device accurately.

SUMMARY

However, the following problem was encountered with the above-mentioned conventional contactless power supply system.

With the contactless power supply system disclosed in the above publication, when a signal is received from the power receiving device to which power is to be supplied and a signal is received from another power receiving device to which power is not to be supplied, power supply to the target power receiving device is resumed, while power supply to the other power receiving device is halted. Consequently, the communication unit receives a signal from only the target power receiving device, so the power supply device accurately receives the power reception information from the target power receiving device and can accurately supply power to the desired power receiving device.

However, with a configuration such as this, no consideration is given to how power can be supplied stably to the power receiving device in the event that the positional relationship between the power supply device and the power receiving device is wrong, or that communication becomes unstable due to the influence of external disturbance, for example.

It is an object of the present invention to provide a contactless power supply system, a contactless power supply method, and a contactless power supply program with which the communication state between a contactless power supply device and a power receiving device can be stabilized, and power supply can be carried out in a stable state.

The contactless power supply system according to the first invention is a contactless power supply system that supplies power from a contactless power supply device to a power receiving device while communicating between the contactless power supply device and the power receiving device, the system comprising a contactless power supply device and a power receiving device. The power receiving device has a power receiving coil unit to which power is supplied from the contactless power supply device, and a first communication unit that communicates with the contactless power supply device and attaches information having continuity to the data transmitted to the contactless power supply device, and transmits the result. The contactless power supply device has a power supply coil unit that supplies power to the power receiving coil unit of the power receiving device; a second communication unit that communicates with the first communication unit of the power receiving device; and a power supply control unit that, in a steady state in which communication is being performed between the first communication unit and the second communication unit after the second communication unit has begun receiving data transmitted from the first communication unit of the power receiving device, refers to information having continuity attached to the continuously received data, and if continuity has been lost, performs correction to increase the output value of the power supplied from the power supply coil unit to the power receiving coil unit.

Here, in a contactless power supply system in which power is supplied from a contactless power supply device to a power receiving device while communicating between the contactless power supply device and the power receiving device, in a steady state, the power supply control unit adjusts the output of power supplied from the power supply coil unit to the power receiving coil unit of the power receiving device depending on whether or not there is a loss of continuity in the information having continuity attached to the data continuously received from the first communication unit of the power receiving device in the second communication unit.

More specifically, in a steady state, the power supply control unit refers to the information having continuity attached to the data received from the first communication unit of the power receiving device in the second communication unit, and if continuity has been lost, an adjustment is made to increase the output of power supplied from the power supply coil unit to the power receiving device.

This "information having continuity" includes, for example, numbers (1, 2, 3, 4, . . . ), letters (a, b, c, d, . . . ), clock times (9:00:00, 9:00:01, 9:00:02, 9:00:03, . . . ), or a combination of these.

Saying that continuity has been lost means, for example, a state in which the information attached to the continuously received data is missing 3 and 5 from the string 1, 2, 4, 6, 7, . . . , etc. That is, when the communication environment deteriorates due to the influence of an external disturbance or the like, for example, part of the continuously received data is lost, and the continuity of information the information having continuity ends up being lost.

The term "contactless power supply" means a state in which the power supply coil unit on the contactless power supply device side and the power receiving coil unit on the power receiving device side are not in direct contact with each other, in which power is supplied to the power receiving device side wirelessly, without using a cord, a metal setting, or the like.

Furthermore, the contactless power supply method may be either electromagnetic induction or a magnetic field resonance method.

Here, when the remaining battery charge on the power receiving device side is almost zero, for example, or when the contactless power supply device and the power receiving device are not in the right positional relationship, or when the system is affected by an external disturbance such as noise, the communication environment will deteriorate, and this can result in interrupted communication between the contactless power supply device and the power receiving device. If this should happen, the contactless power supply device will not be able to receive the data transmitted from the power receiving device in a stable state, so it may not be possible to supply power stably to the power receiving device.

With this contactless power supply system, if the communication environment deteriorates due to an external disturbance or the like in a steady state after the contactless power supply device has been started up, the communication status is deemed to have deteriorated if there has been a loss of continuity in the information having continuity attached to the continuously received data, and the power supply control unit makes a correction to increase the output value to be supplied from the power supply coil unit to the power receiving device.

The term "steady state" means, for example, a state in which communication with the power receiving device and power supply are possible after the contactless power supply device has been started up.

Consequently, even if the communication environment is poor due to an improper positional relationship between the contactless power supply device and the power receiving device, for example, making a correction to increase the output to the power receiving device improves the communication environment between the two and allows power to be supplied stably.

As a result, the state of communication with the power receiving device side can be stabilized, and power can be supplied in a stable state.

The contactless power supply system according to the second invention is the contactless power supply system according to the first invention, wherein the information having continuity includes at least one of numbers, letters, and clock times.

Here, at least one of numbers (1, 2, 3, 4, . . . ), letters (a, b, c, d, . . . ), and clock times (9:00:00, 9:00:01, 9:00:02, 9:00:03, . . . ) is used as the information having continuity attached to the continuously received data in the power receiving device.

Consequently, if the communication environment has deteriorated due to the influence of an external disturbance or the like, for example, and if part of the continuously received data has been lost, a loss of the continuity in the information having continuity will be detected, which makes it easy to detect a deterioration in the communication environment.

The contactless power supply system according to the third invention is the contactless power supply system according to the first or second invention, wherein the contactless power supply device further has a memory unit that stores a correction table showing the relationship between the correction factor used for correcting the output value and the number of missing pieces of data to which the information having continuity is attached.

Here, a memory unit is provided for storing a correction table that shows the relationship between the number of pieces of missing data continuously received and to which information having continuity has been attached, and the correction factor used in correcting the output value.

Consequently, if there is a loss of continuity in the information having continuity attached to the data received from the power receiving device, the power supply control unit can easily obtain a correction factor for correcting the output value by referring to the correction table stored in the memory unit.

The contactless power supply system according to the fourth invention is the contactless power supply system according to the third invention, wherein the power supply control unit finds a correction factor by referring to the correction table stored in the memory unit.

Here, the power supply control unit finds the correction factor used for correcting the output value by referring to the correction table stored in the memory unit.

Consequently, the correction factor needed for correcting the output value can be easily acquired by using the correction table stored in the memory unit.

The contactless power supply system according to the fifth invention is the contactless power supply system according to any of the first to fourth inventions, wherein the contactless power supply device further has a DC input unit to which power is inputted from a power supply, a DC/AC circuit that converts the DC power inputted to the DC input unit into AC power and supplies this power to the power supply coil unit, and a DC/AC control unit that controls the DC/AC circuit on the basis of a signal received from the power supply control unit.

Here, the contactless power supply device further has, for example, a DC input unit to which power is inputted from an external power source such as an outlet, a DC/AC circuit that converts DC power into AC power, and a DC/AC control unit that controls the AC power supplied to the power supply coil unit on the basis of a signal received from the power supply control unit.

Consequently, in the contactless power supply device, the amount of the AC power (output) supplied from the DC/AC circuit to the power supply coil unit can be suitably controlled by the DC/AC control unit.

The contactless power supply system according to the sixth invention is the contactless power supply system according to any of the first to fifth inventions, wherein the power supply control unit corrects the output value by means of duty control of PWM (pulse width modulation).

Here, the power (output) supplied to the power supply coil is corrected by PWM duty control.

Consequently, the output of power supplied to the power supply coil can be easily adjusted by modulating the pulse width.

The contactless power supply system according to the seventh invention is the contactless power supply system according to any of the first to sixth inventions, wherein, upon being started up, the power supply control unit supplies power at a second output that is lower than the first output when supplying power to the power receiving coil unit, until communication is received from the first communication unit of the power receiving device.

Here, after the contactless power supply device has been started up, power is supplied at a second output that is lower than the first output used when power is supplied to the power receiving device, until communication with the power receiving device is received.

That is, the power supply control unit performs low-output power supply from the contactless power supply device until the power receiving device is disposed at a position where power can be supplied to the contactless power supply device.

Consequently, the power receiving device disposed at a position where power can be supplied from the contactless power supply device is able to transmit data to the second communication unit of the contactless power supply device by low-output power supply, even, for example, when the remaining battery charge on the power receiving device side is almost zero, or when the power receiving device is not properly disposed with respect to a contactless power supply device.

The contactless power supply system according to the eighth invention is the contactless power supply system according to the seventh invention, wherein the power supply control unit performs verification processing in which it is verified whether or not the power receiving device is the one to receive power, on the basis of the data received from the first communication unit of the power receiving device during power supply at the second output.

Here, verification processing is performed for verifying the power receiving device to which power is to be supplied on the basis of various kinds of information (such as the ID of the power receiving device) included in the data received from the power receiving device that has received the low-output power supply.

Consequently, after the power receiving device has been verified as the target of power supply, power can be supplied stably to the appropriate power receiving device.

The contactless power supply system according to the ninth invention is the contactless power supply system according to the eighth invention, wherein when the power receiving device is not verified as the one to be supplied power in the verification processing, the power supply control unit performs correction processing for increasing the second output, and again performs verification processing in which it is verified whether or not the power receiving device is the one to receive power, on the basis of the data received from the first communication unit of the power receiving device.

Here, even if the result of the verification using the data received from the power receiving device is that the device cannot be verified due to low-output power supply, it is assumed that the device was not verified because of deterioration of the communication environment or another such reason, correction processing is performed to increase the second output, and verification processing is performed again using the data received from the power receiving device.

Consequently, if the result of the verification using the data received from the power receiving device is that the device cannot be verified due to low-output power supply, power can be supplied stably to the proper power receiving device by re-verifying the power receiving device that could not be verified due to deterioration of the communication environment or another such reason.

The contactless power supply system according to the tenth invention is the contactless power supply system according to any of the first to ninth inventions, wherein the power receiving device further has a battery that stores the power supplied to the power receiving coil unit, and a power reception control unit that controls the output from the power receiving coil unit to the battery.

Here, the power receiving device further has a battery that stores the power supplied to the power receiving coil unit, and a power reception control unit that controls the output from the power receiving coil unit to the battery.

Consequently, the power supplied from the power supply coil unit to the power receiving coil unit can be stored in the battery while the second communication unit on the contactless power supply device side and the first communication unit on the power receiving device side communicate with each other.

The contactless power supply system according to the eleventh invention is the contactless power supply system according to any of the first to tenth inventions, wherein the power receiving device further has a state sensing unit for sensing the electric power supplied to the power receiving coil unit.

Here, in the power receiving device, the state sensing unit senses whether or not the power supplied from the power supply coil unit on the contactless power supply device side to the power receiving coil unit has reached the specific power level that is required on the power receiving device side.

Consequently, whether or not to store the electric power supplied to the power receiving coil unit in the battery, for example, can be determined according to the sensing result from the state sensing unit. Alternatively, for example, the second communication unit can notify the first communication unit on the contactless power supply device side that not enough power has been supplied.

The contactless power supply system according to the twelfth invention is the contactless power supply system according to the eleventh invention, wherein the power reception control unit controls the output from the power receiving coil unit to the battery on the basis of the amount of electricity sensed by the state sensing unit, and notifies the first communication unit of the result.

Here, the power reception control unit uses the sensing result from the state sensing unit to control whether or not to output power from the power receiving coil unit to the battery, and notifies the first communication unit of the sensing result.

More specifically, if the amount of power sensed by the state sensing unit is less than the amount of power required for the power receiving device, control is performed so that no power will be outputted from the power receiving coil unit to the battery, and the first communication unit is notified of the sensing result.

Consequently, whether or not power is to be stored in the battery can be determined on the basis of the sensing result from the state sensing unit, and the fact that not enough power has been supplied can be conveyed to the contactless power supply device side via the first communication unit.

The contactless power supply method according to the thirteenth invention is a contactless power supply method in which communication is performed between a contactless power supply device and a power receiving device, and power is supplied from the contactless power supply device to the power receiving device, the method comprising a communication step, a determination step, and an output correction step. In the communication step, data to which information having continuity has been attached is transmitted from the first communication unit of the power receiving device to the second communication unit of the contactless power supply device. In the determination step, whether or not the information having continuity attached to the continuously received data has lost continuity is determined in a steady state in which communication is being performed between the first communication unit and the second communication unit after the second communication unit starts receiving the data transmitted from the first communication unit. In the output correction step, correction is performed to increase the output value for the power supplied from the power supply coil unit of the contactless power supply device to the power receiving coil unit of the power receiving device if the determination in the determination step is that the continuity of the information having continuity attached to the data has been lost.

Here, in a contactless power supply method in which power is supplied from a contactless power supply device to a power receiving device while communication is performed between the contactless power supply device and the power receiving device, the output of power supplied from the power supply coil unit to the power receiving coil unit of the power receiving device is adjusted according to whether or not there has been a loss of continuity in the information having continuity attached to the data continuously received from the first communication unit of the power receiving device in the second communication unit in a steady state.

More specifically, in a steady state, the second communication unit refers to the information having continuity attached to the data received from the first communication unit of the power receiving device, and if there is a loss of continuity, an adjustment is made to increase the output of power supplied from the power supply coil unit to the power receiving device.

"Information having continuity" includes, for example, numbers (2, 3, 4, . . . ), letters (a, b, c, d, . . . ), clock times (9:00:00, 9:00:01, 9:00:02, 9:00:03, . . . ), combinations of these, and so forth.

Saying that continuity has been lost means a state in which some of the information attached to the continuously received data is missing, such as when 3 and 5 are missing in 1, 2, 4, 6, 7, . . . . That is, when the communication environment deteriorates due to the influence of an external disturbance or the like, for example, some of the continuously received data may be omitted, and the continuity of information having continuity ends up being lost.

The term "contactless power supply" refers to a state in which there is no direct contact between the power supply coil unit on the contactless power supply device side and the power receiving coil unit on the power receiving device side, and power is supplied to the power receiving device side wirelessly, without using cord, a metal setting, or the like.

Furthermore, the contactless power supply method may be an electromagnetic induction method, or a magnetic field resonance method.

Here, the communication environment may suffer when, for example, the remaining battery charge on the power receiving device side is almost zero, or when the contactless power supply device and the power receiving device are not in the right positional relationship, or when the system is affected by an external disturbance such as noise, and therefore communication between the contactless power supply device and the power receiving device may be interrupted. If this should happen, since the data transmitted from the power receiving device cannot be received in a stable state by the contactless power supply device, it may not be possible to supply power stably to the power receiving device.

With this contactless power supply method, if the communication environment deteriorates due to an external disturbance or the like in a steady state after the contactless power supply device has been started up, the communication status is deemed to have deteriorated if there has been a loss of continuity in the information having continuity attached to the continuously received data, and the power supply control unit makes a correction to increase the output value to be supplied from the power supply coil unit to the power receiving device.

The term "steady state" means, for example, a state in which communication with the power receiving device and power supply can be performed after the contactless power supply device has been started up.

Consequently, even if the communication environment deteriorates due to, for example, an improper positional relationship between the contactless power supply device and the power receiving device or another such reason, a correction is made to increase the output to the power receiving device, which improves the communication environment with the power receiving device and allows power supply to be supplied stably.

As a result, the state of communication with the power receiving device side can be stabilized, and power can be supplied in a stable state.

The contactless power supply method according to the fourteenth invention is the contactless power supply method according to the thirteenth invention, wherein the information having continuity includes at least one of numbers, letters, and clock times.

Here, the information having continuity that is attached to the data that is continuously received in the power receiving device is at least one of numbers (1, 2, 3, 4, . . . ), letters (a, b, c, d, . . . ), and clock times (9:00:00, 9:00:01, 9:00:02, 9:00:03, . . . ).

Consequently, when, for example, the communication environment deteriorates due to the influence of an external disturbance or the like, if some of the continuously received information is missing, deterioration in the communication environment can be easily detected by detecting that there is a loss of continuity in the information having continuity.

The contactless power supply method according to the fifteenth invention is the contactless power supply method according to the thirteenth or fourteenth invention, wherein, in the output correction step, the correction factor is found by referring to a correction table that is stored in the memory unit of the contactless power supply device and shows the relationship between the correction factor used for correcting the output value and the number of missing pieces of data to which the information having continuity has been attached.

Here, the correction factor used to correct the output value is found by referring to a correction table that is stored in the memory unit and shows the relationship between the correction factor used for correcting the output value and the number of missing pieces of data to which the information having continuity has been attached.

Consequently, the correction factor required for correcting the output value can be easily acquired by using the correction table stored in the memory unit.

The contactless power supply method according to the sixteenth invention is the contactless power supply method according to any of the thirteenth to fifteenth inventions, wherein, in the output correction step, the output value is corrected by means of duty control of PWM (pulse width modulation).

Here, the power (output) supplied to the power supply coil is corrected by PWM duty control.

Consequently, the output of power supplied to the feeding coil can be easily adjusted by modulating the pulse width.

The contactless power supply method according to the seventeenth invention is the contactless power supply method according to any of the thirteenth to sixteenth inventions, further comprising a low output power supply step of performing power supply at a second output that is lower than the first output when power is supplied to the power receiving device, until communication is received from the power receiving device, after startup.

Here, after the contactless power supply device is started up, power is supplied at a second output that is lower than the first output in supplying power to the power receiving device, until communication with the power receiving device is received.

That is, the power supply control unit performs low output power supply from the contactless power supply device until the power receiving device is disposed at a position where power can be supplied to the contactless power supply device.

Consequently, the power receiving device disposed at a position where power can be supplied from the contactless power supply device can transmit data to the second communication unit of the contactless power supply device by low output power supply even when, for example, the remaining battery charge on the power receiving device side is almost zero, or when the power receiving device is not disposed properly with respect to the contactless power supply device, or the like.

The contactless power supply method according to the eighteenth invention is the contactless power supply method according to the seventeenth invention, further comprising a verification step of performing verification processing in which it is verified whether or not the power receiving device is the one to receive power, on the basis of the data received from the power receiving device during power supply at the second output.

Here, in the contactless power supply device, verification processing is performed to verify that the power receiving device is the one to receive power, on the basis of various kinds of information (such as the ID of the power receiving device) included in the data received from the power receiving device that has received the low output power supply.

Consequently, after the power receiving device has been verified to be the target of power supply, power can be supplied stably to the proper power receiving device.

The contactless power supply method according to the nineteenth invention is the contactless power supply method according to the eighteenth invention, wherein in the verification step, if the power receiving device has not been verified as the one to be supplied power, correction processing is performed to increase the second output, and verification processing is again performed in which it is verified whether or not the power receiving device is the one to receive power, on the basis of the data received from the power receiving device.

Here, even if the verification using the data received from the power receiving device is determined to be negative due to the low output power supply, it is assumed that the device was not verified because of deterioration of the communication environment or another such reason, correction processing is performed so as to increase the second output, and verification processing is performed again using the data received from the power receiving device.

Consequently, in the contactless power supply device, if the result of the verification using the data received from the power receiving device is that the device cannot be verified due to low-output power supply, power can be supplied stably to the proper power receiving device by re-verifying the power receiving device that could not be verified due to deterioration of the communication environment or another such reason.

The contactless power supply program according to the twentieth invention is a contactless power supply program for communicating between a contactless power supply device and a power receiving device and supplying power from the contactless power supply device to the power receiving device, the program causing a computer to execute a contactless power supply method comprising a communication step, a determination step, and an output correction step. In the communication step, data to which information having continuity has been attached is transmitted from a first communication unit of a power receiving device to a second communication unit of a contactless power supply device. In the determination step, it is determined whether or not there is a loss of continuity in the information having continuity attached to the continuously received data in a steady state in which communication is being performed between the first communication unit and the second communication unit after the second communication unit has started receiving the data transmitted from the first communication unit. In the output correction step, correction is performed to increase the output value for the power supplied from the power supply coil unit of the contactless power supply device to the power receiving coil unit of the power receiving device if the determination in the determination step is that the continuity of the information having continuity attached to the data has been lost.

Here, in a contactless power supply method in which power is supplied from a contactless power supply device to a power receiving device while communicating between the contactless power supply device and the power receiving device, the output of power supplied from a power supply coil unit to a power receiving coil unit of the power receiving device is adjusted according to whether or not there is a loss in continuity of information having continuity attached to data continuously received from a first communication unit of the power receiving device in a second communication unit in a steady state.

More specifically, in a steady state, the second communication unit refers to the information having continuity attached to the data received from the first communication unit of the power receiving device, and if continuity has been lost, an adjustment is made to increase the output of power supplied from the power supply coil unit to the power receiving device.

This "information having continuity" includes, for example, numbers (1, 2, 3, 4, . . . ), letters (a, b, c, d, . . . ), clock times (9:00:00, 9:00:01, 9:00:02, 9:00:03, . . . ), or a combination of these.

Saying that continuity has been lost means, for example, a state in which the information attached to the continuously received data is missing 3 and 5 from the string 1, 2, 4, 6, 7, . . . , etc. That is, when the communication environment deteriorates due to the influence of an external disturbance or the like, for example, some of the continuously received data is lost, and the continuity of the information having continuity ends up being lost.

The term "contactless power supply" means a state in which the power supply coil unit on the contactless power supply device side and the power receiving coil unit on the power receiving device side are not in direct contact with each other, in which power is supplied to the power receiving device side wirelessly, without using a cord, a metal setting, or the like.

Furthermore, the contactless power supply method may be either electromagnetic induction or a magnetic field resonance method.

Here, when the remaining battery charge on the power receiving device side is almost zero, for example, or when the contactless power supply device and the power receiving device are not in the right positional relationship, or when the system is affected by an external disturbance such as noise, the communication environment will deteriorate, and this can result in interrupted communication between the contactless power supply device and the power receiving device. If this should happen, the contactless power supply device will not be able to receive the data transmitted from the power receiving device in a stable state, so it may not be possible to supply power stably to the power receiving device.

With this contactless power supply program, if the communication environment deteriorates due to an external disturbance or the like in a steady state after the contactless power supply device has been started up, the communication status is deemed to have deteriorated if there has been a loss of continuity in the information having continuity attached to the continuously received data, and the power supply control unit makes a correction to increase the output value of the power supplied from the power supply coil unit to the power receiving device.

The term "steady state" means, for example, a state in which communication with the power receiving device and power supply are possible after the contactless power supply device has been started up.

Consequently, even if the communication environment is poor due to an improper positional relationship between the contactless power supply device and the power receiving device, for example, making a correction to increase the output to the power receiving device improves communication with the power receiving device and allows power to be supplied stably.

As a result, the state of communication with the power receiving device side can be stabilized, and power can be supplied in a stable state.

BRIEF DESCRIPTION OF THE DRAWINGS

FIG. 7 is a diagram showing a correction table stored in a memory unit of the contactless power supply device in FIG. 1.

DETAILED DESCRIPTION

A contactless power supply system 30 according to an embodiment of the present invention will now be described with reference to FIGS. 1 to 7.

Configuration of Contactless Power Supply System 30

Figure 1:
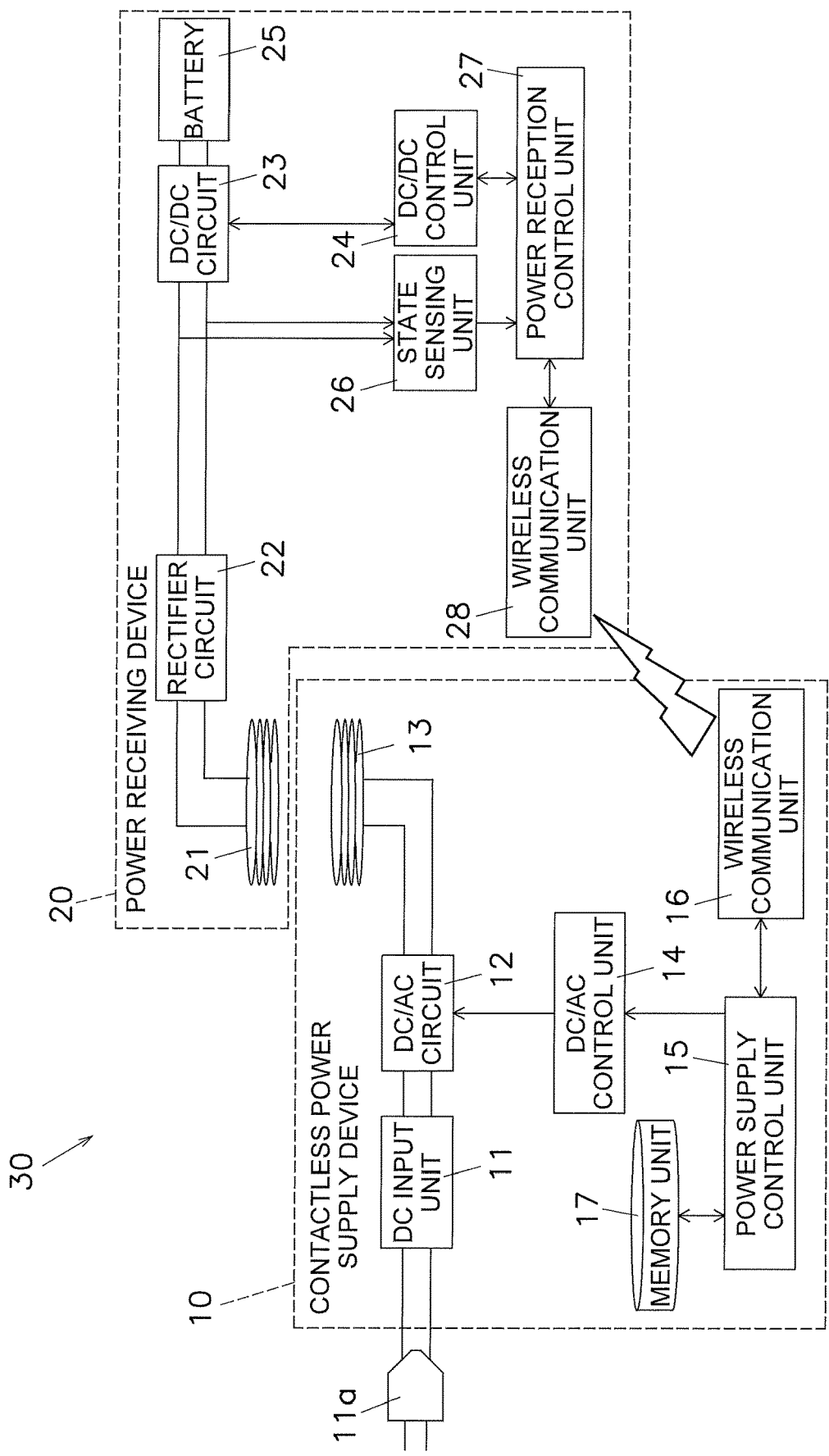
FIG. 1 is a control block diagram showing the configuration of the contactless power supply system according to an embodiment of the present invention.

The contactless power supply system 30 according to this embodiment is a system that supplies power from a contactless power supply device 10 to a power receiving device 20 while communicating between the contactless power supply device 10 and the power receiving device 20, wherein, as shown in FIG. 1, a wireless communication unit 16 on the contactless power supply device 10 side and a wireless communication unit 28 on the power receiving device 20 side communicate with each other, and power is supplied from a power supply coil unit 13 to a power receiving coil unit 21, which are disposed close to each other.

In this embodiment, the term "contactless power supply" means a state in which the power supply coil unit 13 on the contactless power supply device 10 side and the power receiving coil unit 21 on the power receiving device 20 side are not in direct contact with each other, and in which power is supplied from the contactless feeding device 10 to the power receiving device 20 wirelessly, without using a cord, a metal setting, or the like.

The configurations of the contactless power supply device 10 and the power receiving device 20 will be described in detail at a later point.

In this embodiment, the power receiving device 20 to which power is supplied by the contactless power supply device 10 includes, for example, flying devices such as drones; electric vehicles such as electric motorcycles; lawn mowers, work tools, and other such electric tools; vacuum cleaners; robots; and various other such devices having an internal battery that can be charged and discharged, but the power receiving device 20 is not limited to the devices listed here.

Configuration of Contactless Power Supply Device 10

As shown in FIG. 1, the contactless power supply device 10 comprises a DC input unit 11, a DC/AC circuit 12, a power supply coil unit 13, a DC/AC control unit 14, a power supply control unit 15, a wireless communication unit (second communication unit) 16, and a memory unit 17.

DC (direct current) power is inputted to the DC input unit 11 via an external outlet 11a (see FIG. 1).

As shown in FIG. 1, the DC/AC circuit 12 is connected to the DC input unit 11, the DC/AC control unit 14, and the power supply coil unit 13. The DC/AC circuit 12 converts the DC power inputted to the DC input unit 11 into AC (alternating current) power, and control is performed to adjust the output (power supply amount) to the power supply coil unit 13 on the basis of the instruction input from the DC/AC control unit 14.

As shown in FIG. 1, the power supply coil unit 13 is connected to the DC/AC circuit 12, generates a magnetic flux using the AC current outputted from the DC/AC circuit 12, and supplies power to the power receiving coil unit 21 on the power receiving device 20 side, which is disposed nearby.

The method for supplying power from the contactless power supply device 10 to the power receiving device 20 is not limited to an electromagnetic induction method, and other methods such as a resonance method may be employed instead.

As shown in FIG. 1, the DC/AC control unit 14 is connected to the DC/AC circuit 12 and the power supply control unit 15, and controls the DC/AC circuit 12 on the basis of the instruction input from the power supply control unit 15.

As shown in FIG. 1, the power supply control unit 15 is connected to the DC/AC control unit 14, the wireless communication unit 16, and the memory unit 17, and is made up of a CPU and other circuits. The power supply control unit 15 corrects the output (power supply amount) to the power receiving device 20 on the basis of whether there is continuity in the serial numbers (information having continuity) (see FIG. 6) attached to the data received via the wireless communication unit 16.

More specifically, if the continuity of the serial numbers attached to the data received from the power receiving device 20 has been lost, that is, if some of the received data received is missing due to a poor communication environment, an instruction is issued to the DC/AC control unit 14 to adjust the outputted power supply amount.

Here, the continuity of the serial numbers used as the information having continuity refers to the fact that sequential numbers, such as 1, 2, 3, 4, . . . , are attached to the continuously received data in the received order. Therefore, if some of the data received by the wireless communication unit 16 is missing due to a factor such as external disturbance, for example, some of the serial numbers will be missing and continuity will be lost.

The correction of the power supply amount is performed by PWM (pulse width modulation) duty control.

As shown in FIG. 1, the wireless communication unit 16 is connected to the power supply control unit 15, communicates with the wireless communication unit 28 on the power receiving device 20 side, and transmits data received from the power receiving device 20 side to the power supply control unit 15. The wireless communication unit 16 then determines whether or not there is a loss of continuity in the serial numbers (information having continuity) attached to the data received from the power receiving device 20 side.

The communication between the wireless communication unit 16 on the contactless power supply device 10 side and the wireless communication unit 28 on the power receiving device 20 side may be performed in the 2.4 GHz band (2402 to 2480 MHz), for example.

As shown in FIG. 1, the memory unit 17 is connected to the power supply control unit 15 and stores a correction table (see FIG. 7) used for acquiring a correction factor that is used to correct the supplied power value (discussed below).

The processing for supplying power from the contactless power supply device 10 to the power receiving device 20 on the basis of the continuity of the serial numbers attached to the data received by the wireless communication unit 16 (the number of missing pieces of received data) will be discussed in detail below.

Configuration of Power Receiving Device 20

As shown in FIG. 1, the power receiving device 20 comprises the power receiving coil unit 21, a rectifier circuit 22, a DC/DC circuit 23, a DC/DC control unit 24, a battery (load) 25, a state sensing unit 26, a power reception control unit 27, and a wireless communication unit (first communication unit) 28.

As shown in FIG. 1, the power receiving coil unit 21 is connected to the rectifier circuit 22, and an induced electromotive force is generated by the magnetic flux generated in the power supply coil unit 13 on the contactless power supply device 10 side, which is disposed nearby. The power receiving coil unit 21 then sends the electric power received from the contactless power supply device 10 to the rectifier circuit 22.

As shown in FIG. 1, the rectifier circuit 22 is connected to the power receiving coil unit 21, the DC/DC circuit 23, and the state sensing unit 26, and rectifies the AC power received from the power receiving coil unit 21 into DC power.

As shown in FIG. 1, the DC/DC circuit 23 is connected to the rectifier circuit 22, the DC/DC control unit 24, and the battery 25, performs switching on the basis of the instruction input from the DC/DC control unit 24, and controls the output to the battery 25.

As shown in FIG. 1, the DC/DC control unit 24 is connected to the DC/DC circuit 23 and the power reception control unit 27, and controls the switching operation of the DC/DC circuit 23 on the basis of the instruction input from the power reception control unit 27.

The battery 25 is a rechargeable secondary battery, which is connected to the DC/DC circuit 23 as shown in FIG. 1 and stores the DC power outputted from the DC/DC circuit 23.

As shown in FIG. 1, the state sensing unit 26 is connected to the rectifier circuit 22 and the power reception control unit 27, senses the voltage and current values between the rectifier circuit 22 and the DC/DC circuit 23, and notifies the control unit 27 of these values.

As shown in FIG. 1, the power reception control unit 27 is connected to the DC/DC control unit 24, the state sensing unit 26, and the wireless communication unit 28. The power reception control unit 27 compares the voltage and current values sensed by the state sensing unit 26 with a preset reference voltage value and reference current value, determines that there is no problem with the amount of received power in the event that the reference voltage value is greater than the reference current value, and notifies the DC/DC control unit 24 to output from the DC/DC circuit 23 to the battery 25. Also, the power reception control unit 27 transmits the voltage value and the current value sensed by the state sensing unit 26 to the wireless communication unit 28. Furthermore, in the transmission of data (voltage value and current value) from the wireless communication unit 28 to the wireless communication unit 16 on the contactless power supply device 10 side, the power reception control unit 27 creates a message in which a serial number or the like is attached to the data, and this message is transmitted from the wireless communication unit 28 (see FIG. 6).

The wireless communication unit 28 is constituted by a circuit including a CPU, and is connected to the power reception control unit 27 as shown in FIG. 1. The wireless communication unit 28 transmits to the wireless communication unit 16 on the contactless power supply device 10 side a message (see FIG. 6) including the data received from the power reception control unit 27 (the voltage value and current value of the received power, etc.), a serial number, and an error detection code (CRC (cyclic redundancy check)).

<Processing at Startup of Contactless Power Supply Device 10>

The startup processing (low output power supply) performed in the contactless power supply device 10 of this embodiment will now be described using the flowchart shown in FIG. 2.

With the contactless power supply device 10 of this embodiment, in processing of the previous stage in which the target of the power supply is the power receiving device 20, power is outputted at a lower level than during normal power supply, while the system waits until the power receiving device 20 is disposed at a position where communication is possible.

Figure 2:
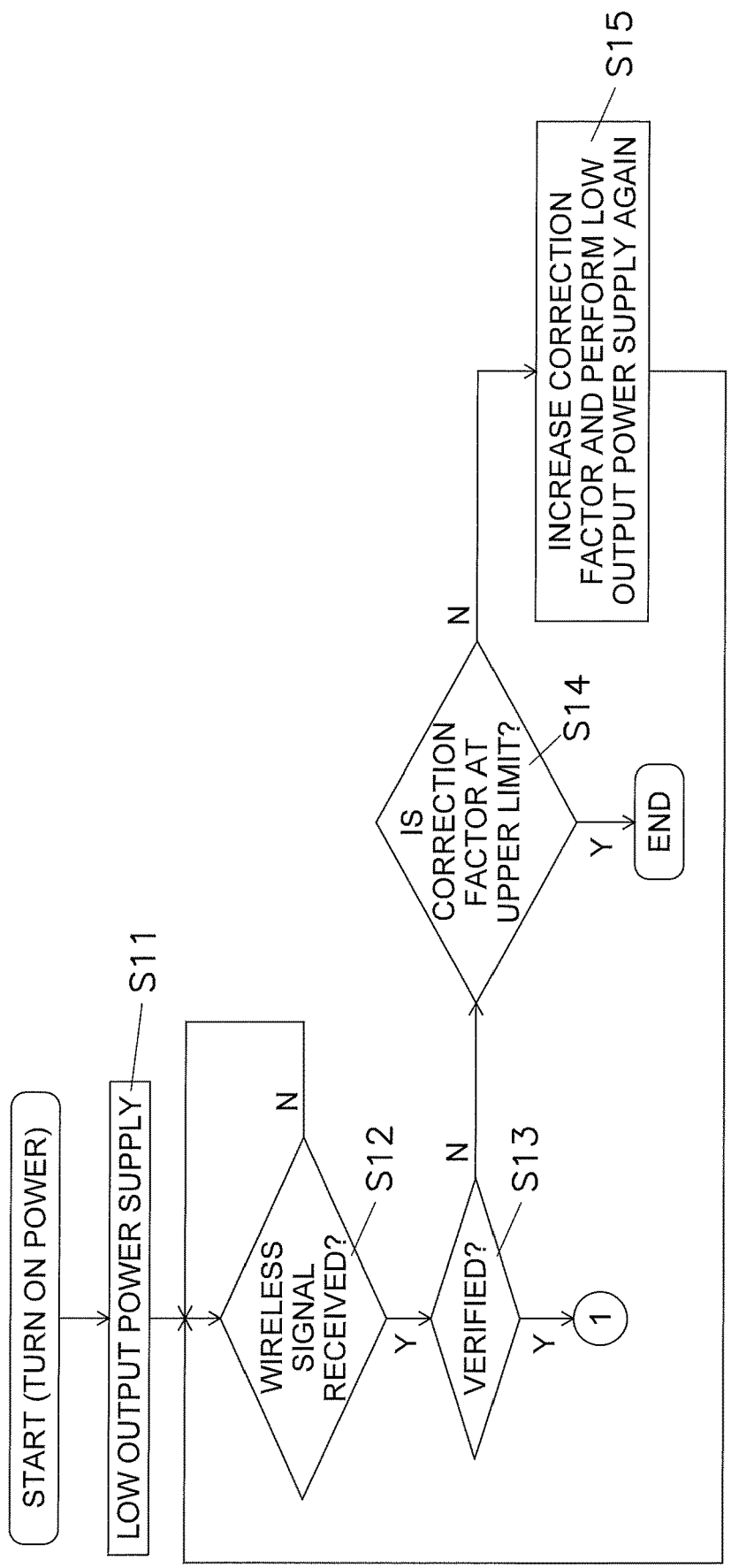
FIG. 2 is a flowchart showing the processing flow at startup of the contactless power supply device included in the contactless power supply system in FIG. 1.

More specifically, as shown in FIG. 2, when the power is turned on to the contactless power supply device 10, in step S11 power is supplied at a lower level (low output power supply) than that of the power supplied normally to the power receiving device 20, regardless of whether or not the power receiving device 20 is disposed within a communicable range.

Here, the power supply control unit 15 instructs the DC/AC control unit 14 to reduce the output from the DC/AC circuit 12. Consequently, electric power is outputted from the power supply coil unit 13 at a lower level than that during normal power supply.

This low output power supply is performed after the contactless power supply device 10 is started up and until, for example, wireless communication is received from the power receiving device 20 disposed within the communicable range, or is performed continuously until the power is turned off to the contactless power supply device 10.

Next, in step S12, the wireless communication unit 16 waits to receive a wireless signal (data) from the wireless communication unit 28 of the power receiving device 20 that has been supplied low output power, and once the wireless signal (data) is received from the wireless communication unit 28 of the power receiving device 20, the flow proceeds to step S13.

Next, in step S13, the power supply control unit 15 performs processing to confirm whether or not there is verification in order to confirm whether or not there is communication from the power receiving device 20 to which power is to be supplied, on the basis of the information received from the power receiving device 20. Here, if the power supply control unit 15 determines that the power receiving device 20 has been verified as the power supply target, the flow proceeds to the processing flow shown in FIG. 5 in order to supply power at the normal power level. On the other hand, if verification was not possible, the flow proceeds to step S14.

Here, possible reasons why verification is not possible are when the communication is with a device that is not the target of power supply, when the power supplied at low output power supply is insufficient for stable communication, and so forth. Therefore, in steps S14 and S15, processing is performed to aid a power receiving device 20 that could not be verified for the latter reason.

That is, in step S14, in order to confirm whether or not the power in the low output power supply to the power receiving device 20 that was not verified in step S13 is the maximum output, the power supply control unit 15 determines whether or not the correction factor has reached its upper limit.

Here, if the correction factor has not reached its upper limit, the output of the low output power supply is increased by one level, and the flow proceeds to step S15 in order to retry for verification.

On the other hand, if the correction factor has reached its upper limit, it is unlikely that verification was not made because sufficient communication could not be performed due to insufficient power being supplied, so the power supply control unit 15 determines that the communication is with a device that is not the target of power supply, and the processing is halted without any power being supplied.

Next, in step S15, the power supply control unit 15 raises the correction factor, performs low output power supply again, and waits until a wireless signal is received in step S12.

The processing from step S12 to step S15 is repeated until the power receiving device 20 is verified or until the correction factor of the low output power supply reaches its upper limit.

<Processing in Power Receiving Device 20>

Next, the processing on the power receiving device 20 side, which receives the above-mentioned low output power supply from the contactless power supply device 10 to perform communication and is verified by the contactless power supply device 10, will be described using the flowchart shown in FIG. 3.

Figure 3:
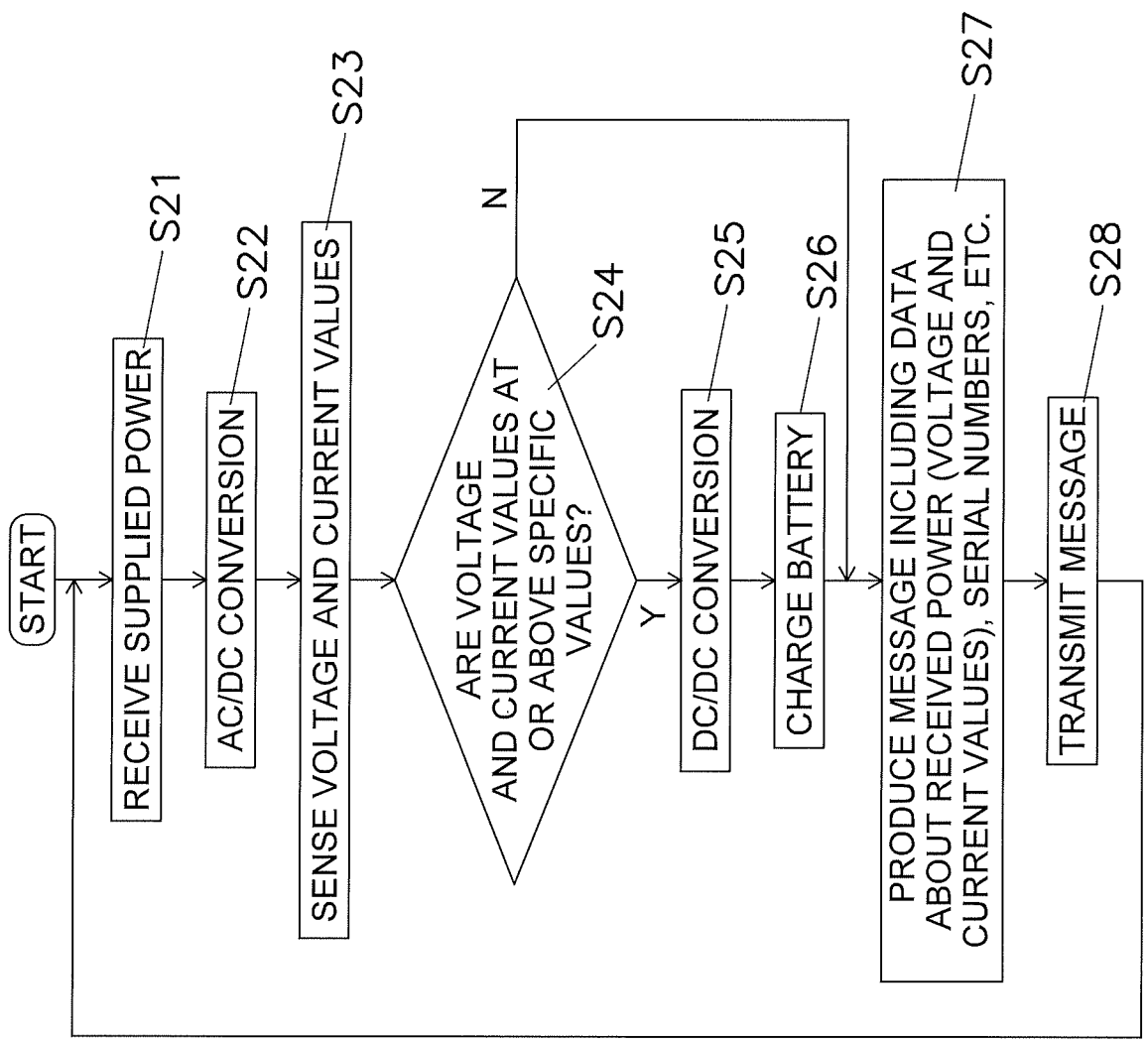
FIG. 3 is a flowchart showing the processing flow on the power receiving device side included in the contactless power supply system in FIG. 1.

That is, as shown in FIG. 3, in step S21, the power receiving coil unit 21 of the verified power receiving device 20 receives the power outputted from the power supply coil unit 13 on the contactless power supply device 10 side.

Next, in step S22, at the rectifier circuit 22, the AC power received by the power receiving coil unit 21 is rectified into DC power and outputted to the DC/DC circuit 23 and the state sensing unit 26.

Next, in step S23, the state sensing unit 26 senses the voltage value and the current value of the received power.

Next, in step S24, the power reception control unit 27 determines whether or not the voltage value and the current value sensed by the state sensing unit 26 are equal to or greater than specific values.

Here, if these values are equal to or greater than the specific values, the flow proceeds to step S25, and if these values are below the specific values, the battery 25 is not charged, and the flow proceeds to step S27 in order to notify the contactless power supply device 10 side that not enough power has been received.

Next, in step S25, since the power reception control unit 27 has confirmed in step S24 that the received power is equal to or greater than the specific values, the DC/DC control unit 24 controls the DC/DC circuit 23 to perform DC/DC conversion and output the result to the battery 25.

Next, in step S26, the power outputted from the DC/DC circuit 23 is used to charge the battery 25.

Next, in step S27, the power reception control unit 27 produces a message (see FIG. 6) in which serial numbers (information having continuity) and an error detection code (CRC) have been attached to data such as the voltage value and the current value sensed from the power received by the state sensing unit 26.

Next, in step S28, the power reception control unit 27 controls the wireless communication unit 28 so as to transmit the message produced by the power reception control unit 27, in which serial numbers, etc., have been attached to data such as the received power (voltage value and current value), from the wireless communication unit 28 to the wireless communication unit 16 on the contactless power supply device 10 side. Once the processing of step S28 is complete, the processing of steps S21 to S28 is repeated.

Here, the received power (voltage value and current value) included in the message transmitted from the wireless communication unit 28 to the contactless power supply device 10 side is used to verify on the contactless power supply device 10 side whether or not enough power has been supplied on the power receiving device 20 side. Therefore, with the contactless power supply device 10, if the power values (voltage value and current value) received from the power receiving device 20 side are not sufficient according to the power receiving device 20 side, an adjustment is made to increase the output of the power supply.

<Message Analysis Processing in Contactless Power Supply Device 10>

The processing to analyze the radio wave status included in the message received from the power receiving device 20, which is performed in the wireless communication unit 16 of the contactless power supply device 10 of this embodiment, will now be described using the flowchart shown in FIG. 4.

Figure 4:
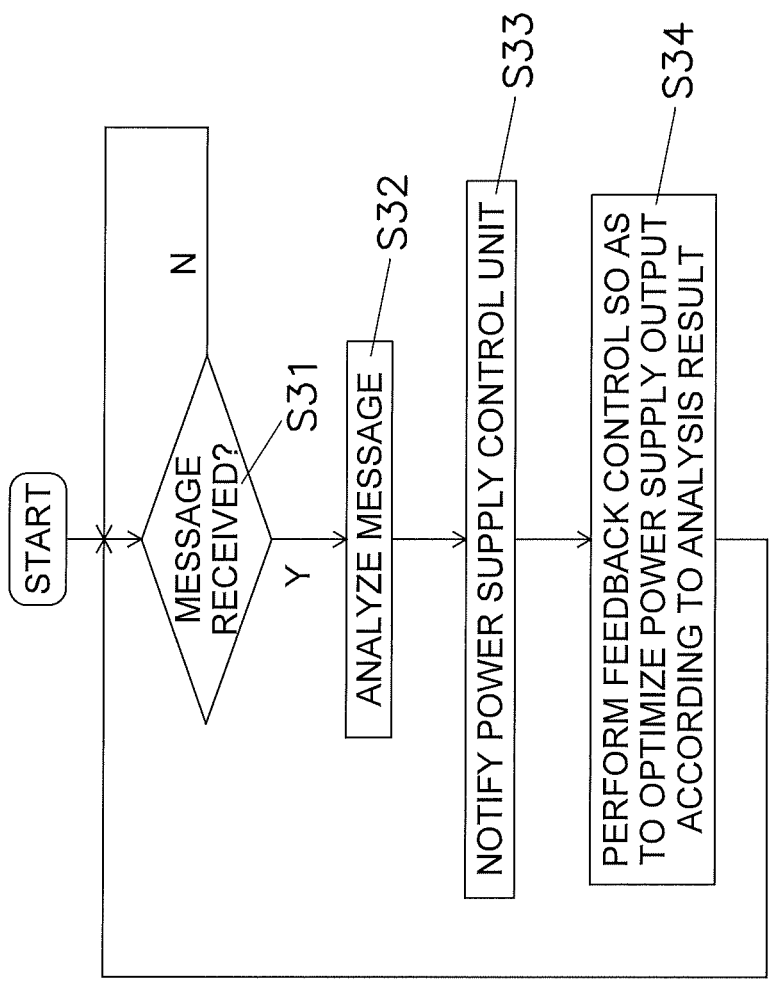
FIG. 4 is a flowchart showing the processing flow of message analysis, etc., on the contactless power supply device side in FIG. 1.

That is, as shown in FIG. 4, in step S31, the wireless communication unit 16 receives the message created by the power receiving device 20 from the wireless communication unit 28 of the power receiving device 20.

Next, in step S32, the wireless communication unit 16 analyzes the received message. More specifically, the wireless communication unit 16 acquires the power (voltage value and current value) received by the power receiving device 20 through message analysis, and performs control so as to block communication with devices other than the power supply target.

Next, in step S33, the wireless communication unit 16 notifies the power supply control unit 15 of the result of analyzing the message including the data such as the received voltage value and the current value, and of the result of analyzing the radio wave intensity.

The processing to analyze the radio wave intensity and the like included in the message may be performed as in this embodiment by the wireless communication unit 16, which includes a CPU or other such circuit, or may be performed by the power supply control unit 15.

In step S34, the power supply control unit 15 determines whether or not the proper amount of power is being supplied to the power receiving device 20 on the basis of the analysis result of the message notified in step S33, and if it is not, feedback control is performed to adjust the output value so that that the proper amount of power is supplied.

<Output Correction Processing in Contactless Power Supply Device 10>

The processing to correct the output of power based on the continuity of the serial numbers attached to the data received from the power receiving device 20, which is executed by the contactless power supply device 10 of this embodiment in a steady state in which communication is being performed between the contactless power supply device 10 and the power receiving device 20 after communication with the power receiving device 20 has begun, will now be described using the flowchart shown in FIG. 5.

Figure 5:
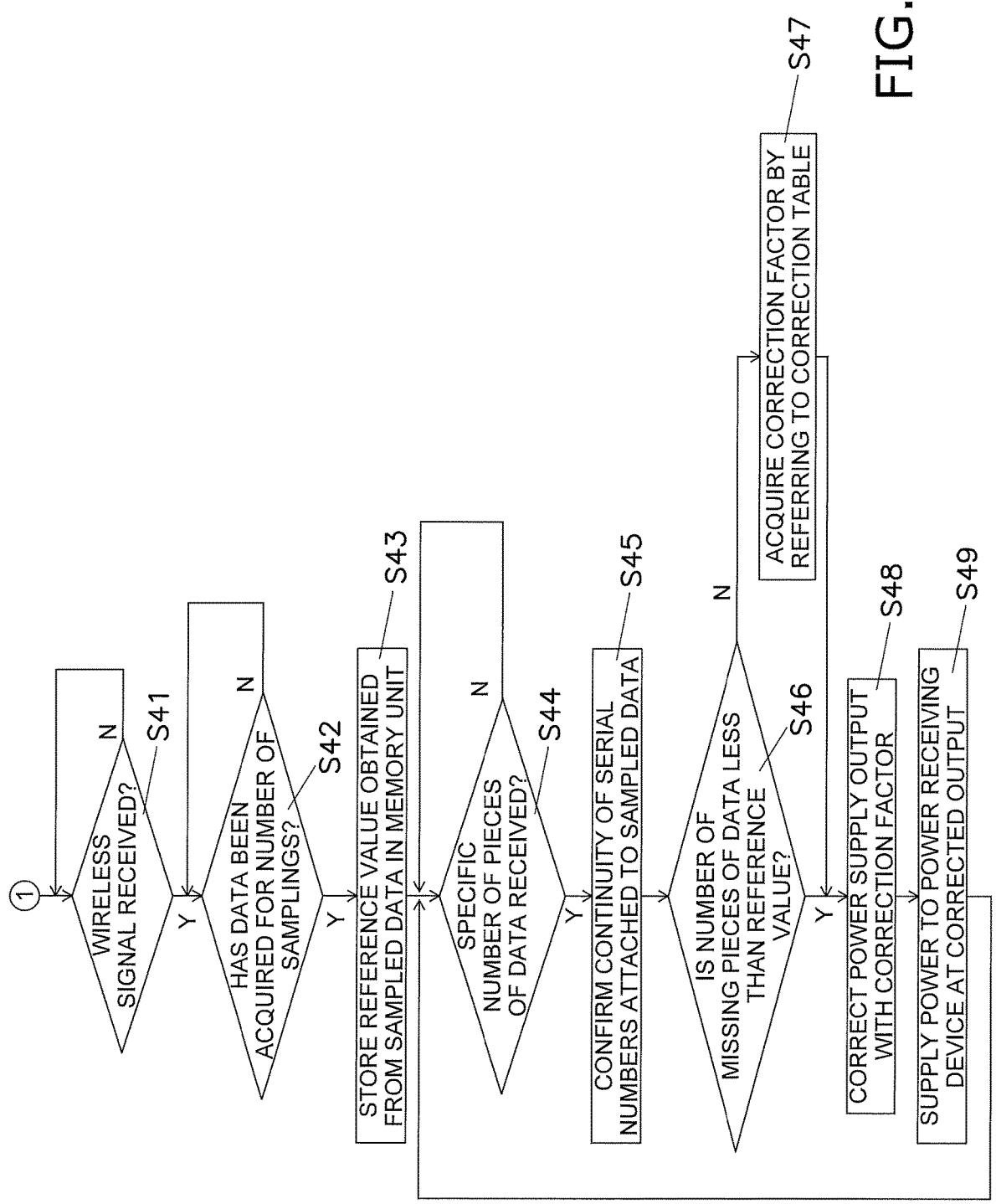
FIG. 5 is a flowchart showing the processing flow of output correction control on the basis of the continuity of serial numbers attached to data received on the contactless power supply device side in FIG. 1.
Figure 6:
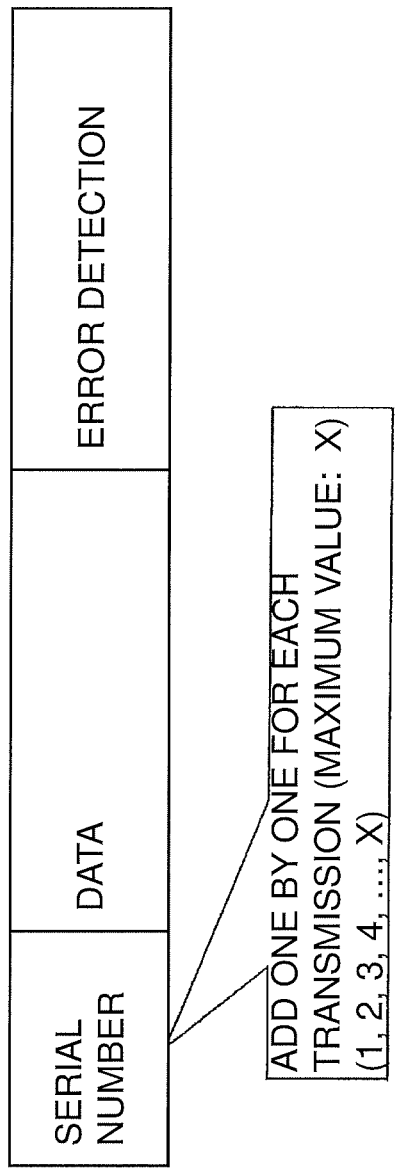
FIG. 6 is a diagram showing the content of a message (data, serial numbers, etc.) received by the contactless power supply device in FIG. 1.

As shown in FIG. 5, in step S41, the wireless communication unit 16 waits until a wireless signal is received from the power receiving device 20 side, and when a wireless signal is received, the flow proceeds to step S42.

Next, in step S42, data is acquired until the number of communications between the wireless communication unit 16 of the contactless power supply device 10 and the wireless communication unit 28 of the power receiving device 20 reaches a predetermined sampling number.

In this embodiment, the number of samplings is set to 10, so the processing of step S43 is repeated until communication data has been received 10 times from the power receiving device 20.

Next, in step S43, a reference value for output correction control obtained from the sampled data (for 10 receptions) is stored in the memory unit 17.

In this embodiment, the reference value indicating three missing pieces of data is stored in the memory unit 17 after reference to the 10 pieces of sampled data.

Next, in step S44, the system waits until new data (message) is received. Here, if new data (message) has been received, the system waits until a specific number of pieces of data (10 in this case) have been received, and once the specific number of pieces of data have been received, the flow proceeds to step S45.

Next, in step S45, the power supply control unit 15 confirms the continuity of the serial numbers attached to the data for 10 times received by the wireless communication unit 16. More precisely, the power supply control unit 15 confirms whether or not the serial numbers attached to the data for 10 times received by the wireless communication unit 16 are continuous from 1 through 10.

Next, in step S46, the power supply control unit 15 determines whether or not the number of missing pieces of data (serial numbers) for 10 times received by the wireless communication unit 16 is less than the reference value calculated in step S43 (three in this embodiment).

The number of missing pieces of data is the number of missing serial numbers out of data received 10 times. For example, if the serial numbers 1, 2, 3, 4, . . . , 10 are supposed to be received, it is determined that three numbers are missing when the serial numbers 4, 6, and 8 are omitted and the serial numbers 1, 2, 3, 5, 7, 9, 10, 11, 12, and 13 are attached to the 10 pieces of data that are received.

Here, the continuity of the serial numbers is checked, and if the number of pieces of missing data received is less than three, it is determined that normal communication is being performed, and the flow proceeds to step S48. On the other hand, if the number of pieces of missing data received is three or more, it is determined that communication between the contactless power supply device 10 and the power receiving device 20 may be interrupted and normal communication is not being performed, and the flow proceeds to step S47.

The reference value (threshold) used for the determination in step S46 is not limited to three, and may be set to a value greater than three, or may be set to a value less than three, such as one or two.

Next, in step S47, since it has been determined in step S46 that the number of pieces of missing data is three or more, the power supply control unit 15 refers to the correction table stored in the memory unit 17, and acquires a correction factor to be used in output correction control.

Here, as shown in FIG. 7, the correction table stored in the memory unit 17 shows the relation between a number of missing pieces of data that is between three and nine for 10 sets of data, and the correction factor (%) used for the output correction control.

In the correction table shown in FIG. 7, if, for example, the number of missing pieces of data is three or less, it is assumed that normal and stable communication is being performed, so the correction factor is set to 100%.

If the number of pieces of missing data is four, five, or six, it is assumed that communication is somewhat unstable, so the correction factors are set to 110%, 120%, and 130%, respectively. Consequently, when the communication state is somewhat unstable, a correction factor is selected so that the output of power supplied to the power receiving device 20 increases.

Furthermore, when the number of pieces of missing data loss is seven, eight, or nine, it is assumed that communication is unstable, so the correction factors increase even further to 140%, 150%, and 160%, respectively. Consequently, when the communication state is unstable, a correction factor is selected so that the output of power supplied to the power receiving device 20 is further increased.

Therefore, the power supply control unit 15 can easily acquire the optimum correction factor corresponding to the number of missing pieces of received data by referring to the correction table shown in FIG. 7 stored in the memory unit 17.

Next, in step S48, the power supply control unit 15 uses the correction factor acquired by referring to the correction table to correct the output of power supplied from the power supply coil unit 13 to the power receiving coil unit 21 on the power receiving device 20 side.

More specifically, in the output correction processing performed by the contactless power supply system 30 in this embodiment, the corrected output is calculated from this formula: power supply output voltage value (V)× correction factor (%).

Next, in step S49, the power supply control unit 15 instructs the DC/AC control unit 14 to supply power from the power supply coil unit 13 to the power receiving coil unit 21 on the power receiving device 20 side at the corrected output calculated in step S48, and the flow goes back to step S44.

In this embodiment, as described above, the contactless power supply device 10 that communicates with the power receiving device 20 and supplies power to the power receiving device 20 comprises the power supply coil unit 13, the wireless communication unit 16, and the power supply control unit 15. The power supply coil unit 13 supplies power to the power receiving device 20. The wireless communication unit 16 communicates with the wireless communication unit 28 on the power receiving device 20 side. When the wireless communication unit 16 starts receiving the data transmitted from the power receiving device 20, if there is a loss of continuity in the serial numbers attached to the newly received data in a steady state in which the contactless power supply device 10 and the power receiving device 20 are communicating with each other, that is, if the number of missing pieces of data is equal to or greater than a reference value, the power supply control unit 15 performs correction to increase the output value of power supplied from the power supply coil unit 13 to the power receiving device 20.

That is, with the contactless power supply device 10 of this embodiment, when there is a loss of continuity in the serial numbers attached to the data received from the power receiving device 20 in the wireless communication unit 16 (when the number of missing pieces of received data is equal to or greater than a reference value), it is assumed that the communication environment may have deteriorated since the start of communication, and an adjustment is made to increase the output of power supplied from the power supply coil unit 13 to the power receiving device 20.

Here, when the remaining battery charge on the power receiving device 20 side is almost zero, for example, or when the contactless power supply device 10 and the power receiving device 20 are not in the right positional relationship, or when the system is affected by an external disturbance such as noise, the communication environment will deteriorate, and this can result in an interruption of the radio waves included in the data received from the power receiving device 20. If this should happen, the data transmitted from the power receiving device 20 cannot be received in a stable state, so it may not be possible to supply power stably to the power receiving device 20.

With the contactless power supply device 10, if the communication environment has deteriorated since the start of communication in a steady state, and there is a loss in continuity of the information attached to the received data, the power supply control unit 15 makes a correction to increase the output value of power supplied from the power supply coil unit 13 to the power receiving device 20 (the power receiving coil unit 21).

Consequently, even if the communication environment is poor due to an improper positional relationship between the contactless power supply device 10 and the power receiving device 20 or another such reason, a correction is made to increase the output to the power receiving device 20, which improves the communication environment between the contactless power supply device 10 and the power receiving device 20 and allows power to be supplied stably.

As a result, the communication state when the contactless power supply device 10 and the power receiving device 20 are in a steady state can be stabilized, and power can be supplied in a stable state.

Other Embodiments

An embodiment of the present invention was described above, but the present invention is not limited to or by the above embodiment, and various modifications can be made without departing from the gist of the invention.

(A)

In the above embodiment, an example was described in which serial numbers (1, 2, 3, 4, . . . x) were used as information having continuity attached to continuously received data, but the present invention is not limited to this.

For instance, instead of serial numbers, the information having continuity may be letters or other such characters (a, b, c, d, . . . , z), clock times (9:00:00, 9:00:01, 9:00:02, 9:00:03, . . . ), or the like.

Alternatively, a combination of numbers, letters, clock times, etc., may be used as the information having continuity.

(B)

In the above embodiment, an example was described in which a reference value (three missing numbers) used in determining the output correction control was calculated from a specific number of pieces of sampled data, but the present invention is not limited to this.

For instance, a preset numerical value may be used as a reference value in determining the output correction control.

(C)

In the above embodiment, as shown in FIG. 7, an example was described in which the power supply control unit 15 of the contactless power supply device 10 performed output correction control by referring to a correction table showing the relation between the number of missing pieces of data received from the power receiving device 20 and the correction factor, but the present invention is not limited to this.

For instance, the correction table is not limited to one that shows the relation between the number of missing pieces of data and the correction factor, and may instead be one that shows the relation between the proportion of missing data (%) and the correction factor.

(D)

In the above embodiment, an example was described in which the contactless power supply system 30 was configured such that power was supplied from a single contactless power supply device 10 to a single power receiving device 20, but the present invention is not limited to this.

For instance, it may be a contactless power supply system that supplies power from a single contactless power supply device substantially simultaneously to a plurality of power receiving devices.

(E)

In the above embodiment, an example was described in which whether or not to perform output correction control was determined on the basis of whether or not there was continuity in the serial numbers (information having continuity) attached to the data received by the wireless communication unit 16, but the present invention is not limited to this.

For instance, the wireless communication unit 16 of the contactless power supply device 10 may determine the output correction control.

(F)

In the above embodiment, an example was described of a configuration in which the wireless communication unit 16 that communicates with the power receiving device 20 side and the power supply control unit 15 that controls power supply from the power supply coil unit 13 are provided separately, but the present invention is not limited to this.

For instance, the present invention may be realized as a single microprocessor comprising a communication function for communicating with the power receiving device 20 side, and a power supply control function for controlling power supply from the power supply coil unit 13.

(G)

In the above embodiment, an example was described in which the present invention was realized as the contactless power supply system 30 and a contactless power supply method, but the present invention is not limited to this.

For instance, the present invention may be realized as a control program that causes a computer to execute the contactless power supply method described in the above embodiment.

This control program may be stored in the memory unit 17 shown in FIG. 1, and can be read by hardware such as a CPU to cause a computer to execute the above-mentioned control method.

(H)

In the above embodiment, an example was described in which, at startup, power is supplied from the contactless power supply device 10 at a lower output than during normal power supply (low output power supply), and the system waits until wireless communication is received from the power receiving device 20 to which the low output power supply was supplied. However, the present invention is not limited to this.

For instance, the configuration may be such that the system waits for wireless communication to be received from the power receiving device 20 that has been supplied with power while power is being supplied at substantially the same output as normal from the time of startup.

In this case, however, even if there is no power receiving device 20 in the vicinity, power supply will always end up being performed at high output, so when power consumption on the contactless power supply device 10 side and so forth are taken into account, it is preferable for low output power supply to be performed first at the time of startup as in the above embodiment.

REFERENCE NUMERALS 10 contactless power supply device
11 DC input unit
11a external outlet
12 DC/AC circuit
13 power supply coil unit
14 DC/AC control unit
15 power supply control unit
16 wireless communication unit (second communication unit)
17 memory unit
20 power receiving device
21 power receiving coil unit
22 rectifier circuit
23 DC/DC circuit
24 DC/DC control unit
25 battery (load)
26 state sensing unit
27 power reception control unit
28 wireless communication unit (first communication unit)
30 contactless power supply system

The invention claimed is:

1. A contactless power supply system comprising:
a contactless power supply device; and
a power receiving device,
power being supplied from the contactless power supply device to the power receiving device while communication is performed between the contactless power supply device and the power receiving device,
the power receiving device including
a power receiving coil unit supplied with the power from the contactless power supply device, and
a first communication unit configured to communicate with the contactless power supply device and attach information having continuity to data transmitted to the contactless power supply device and then transmit the data, and
the contactless power supply device including
a power supply coil unit configured to supply the power to the power receiving coil unit of the power receiving device,
a second communication unit configured to communicate with the first communication unit of the power receiving device, and
a power supply control unit configured to refer to the information having continuity attached to the data continuously received in a steady state in which communication is performed between the first communication unit and the second communication unit after the second communication unit begins receiving the data transmitted from the first communication unit of the power receiving device, and perform correction to increase an output value of the power supplied from the power supply coil unit to the power receiving coil unit in a case where the continuity is lost.

2. The contactless power supply system according to claim 1,
wherein the information having continuity includes at least one of numbers, letters, or clock times.

3. The contactless power supply system according to claim 1,
wherein the contactless power supply device further includes a memory unit configured to store a correction table showing a relationship between a correction factor used for correcting the output value, and a number of missing pieces of the information having continuity.

4. The contactless power supply system according to claim 3,
wherein the power supply control unit finds the correction factor by referring to the correction table stored in the memory unit.

5. The contactless power supply system according to claim 1,
wherein the contactless power supply device further includes
a DC input unit to which power is inputted from a power supply,
a DC/AC circuit configured to convert the power inputted to the DC input unit into AC power and supply the AC power to the power supply coil unit, and
a DC/AC control unit configured to control the DC/AC circuit based on a signal received from the power supply control unit.

6. The contactless power supply system according to claim 1,
wherein the power supply control unit corrects the output value by duty control of pulse width modulation.

7. The contactless power supply system according to claim 1,
wherein, upon being started up, the power supply control unit supplies power at a second output that is lower than a first output for supplying power to the power receiving coil unit, until communication is received from the first communication unit of the power receiving device.

8. The contactless power supply system according to claim 7,
wherein the power supply control unit performs a verification process to verify whether or not the power receiving device is a target to supply power, based on the data received from the first communication unit of the power receiving device during power supply at the second output.

9. The contactless power supply system according to claim 8,
wherein, in a case where the power receiving device is not verified as the target to supply power in the verification process, the power supply control unit performs a correction process to increase the second output, and again performs the verification process based on the data received from the first communication unit of the power receiving device.

10. The contactless power supply system according to claim 1,
wherein the power receiving device further includes
a battery configured to store the power supplied to the power receiving coil unit, and
a power reception control unit configured to control an output from the power receiving coil unit to the battery.

11. The contactless power supply system according to claim 10,
wherein the power receiving device further includes a state sensing unit configured to sense an electric power supplied to the power receiving coil unit.

12. The contactless power supply system according to claim 11,
wherein the power reception control unit controls the output from the power receiving coil unit to the battery based on an amount of the electric power sensed by the state sensing unit, and notifies the first communication unit of a result.

13. A contactless power supply method in which communication is performed between a contactless power supply device and a power receiving device, and power is supplied from the contactless power supply device to the power receiving device, the method comprising:
transmitting data to which information having continuity is attached, from a first communication unit of the power receiving device to a second communication unit of the contactless power supply device;
determining whether or not there is a loss of continuity in the information having continuity attached to the data continuously received, in a steady state in which communication is performed between the first communication unit and the second communication unit after the second communication unit begins to receive the data transmitted from the first communication unit; and
performing correction to increase an output value for the power supplied from a power supply coil unit of the contactless power supply device to a power receiving coil unit of the power receiving device in a case where the continuity of the information having continuity attached to the data is determined to have been lost in the determining.

14. The contactless power supply method according to claim 13,
wherein the information having continuity includes at least one of numbers, letters, or clock times.

15. The contactless power supply method according to claim 13,
wherein, in the performing correction, a correction factor used for correcting the output value is found by referring to a correction table that is stored in a memory unit of the contactless power supply device and shows a relationship between the correction factor used for correcting the output value and the number of missing pieces of data to which the information having continuity is attached.

16. The contactless power supply method according to claim 13,
wherein, in the performing correction, the output value is corrected by duty control of pulse width modulation.

17. The contactless power supply method according to claim 13, further comprising
performing power supply at a second output that is lower than a first output for supplying power to the power receiving device, until communication is received from the power receiving device, after activation.

18. The contactless power supply method according to claim 17, further comprising
performing a verification process to verify whether or not the power receiving device is a target to supply power, based on the data received from the power receiving device during power supply at the second output.

19. The contactless power supply method according to claim 18,
wherein in the verification process, in a case where the power receiving device is not verified as the target to supply power, a correction process is performed to increase the second output, and the verification is again performed based on the data received from the power receiving device.

20. A non-transitory computer-readable medium storing a contactless power supply program for communicating between a contactless power supply device and a power receiving device and supplying power from the contactless power supply device to the power receiving device, the program causing a computer to execute a contactless power supply method comprising:
transmitting data to which information having continuity is attached, from a first communication unit of the power receiving device to a second communication unit of the contactless power supply device;

determining whether or not there is a loss of continuity in the information having continuity attached to the data continuously received, in a steady state in which communication is performed between the first communication unit and the second communication unit after the second communication unit begins to receive the data transmitted from the first communication unit; and performing correction to increase an output value for the power supplied from a power supply coil unit of the contactless power supply device to a power receiving coil unit of the power receiving device in a case where the continuity of the information having continuity attached to the data is determined to have been lost in the determining.

* * * * *